United States Patent [19]

McGill et al.

[11] Patent Number: 5,085,026
[45] Date of Patent: Feb. 4, 1992

[54] CONICAL SEISMIC ANCHOR AND DRILL BIT FOR USE WITH UNREINFORCED MASONRY STRUCTURES

[76] Inventors: Scott A. McGill; Sterling A. McGill, both of 21690 Wahoo Trail, Chatsworth, Calif. 91311

[21] Appl. No.: 615,908

[22] Filed: Nov. 20, 1990

[51] Int. Cl.$^5$ .......................... E04B 2/30; E05D 15/48
[52] U.S. Cl. .................... 52/741; 52/167 R; 52/698; 52/705; 411/55
[58] Field of Search ....... 52/167 R, 167 DF, 167 CB, 52/741, 742, 743, 744, 698, 705; 411/55, 82, 258; 408/224, 225; 405/259, 260

[56] References Cited

U.S. PATENT DOCUMENTS

| | | | |
|---|---|---|---|
| 1,850,768 | 3/1932 | Peirce | 411/55 |
| 2,362,260 | 11/1944 | Foster | 408/224 |
| 3,379,016 | 4/1968 | Williams | 52/698 |
| 3,736,712 | 6/1973 | Muto et al. | 52/167 |
| 3,764,066 | 10/1973 | Kowell | 52/698 X |
| 3,921,353 | 11/1975 | Howlett et al. | 52/223 |
| 4,052,925 | 10/1977 | McCarthy | 85/77 |
| 4,078,752 | 3/1978 | Kindorf | 248/62 |
| 4,215,519 | 8/1980 | Koch | 52/741 |
| 4,248,555 | 2/1981 | Satou | 408/225 |
| 4,339,217 | 7/1982 | Lacey | 411/55 |
| 4,353,673 | 10/1982 | Lesowsky | 411/38 |
| 4,362,421 | 12/1982 | Kelly | 403/369 |
| 4,452,019 | 6/1984 | Ikuo et al. | 52/167 |
| 4,498,817 | 2/1985 | Oulsnam | 405/260 |
| 4,564,321 | 1/1986 | Kondo et al. | 408/224 X |
| 4,571,018 | 2/1986 | Annoot | 339/60 |
| 4,772,166 | 9/1988 | Shamah et al. | |
| 4,802,316 | 2/1989 | Kelly et al. | 52/90 |
| 4,875,319 | 10/1989 | Hohmann | 52/383 |
| 4,875,808 | 10/1989 | Kellison | 405/244 |

FOREIGN PATENT DOCUMENTS 0603527 4/1960 Italy ............................ 411/55
1444559 8/1976 United Kingdom .................. 411/55

OTHER PUBLICATIONS

Catalog Pages for Anchors from C.R. Laurence Co. Inc.; pp. 172-179.
City of Los Angeles Department of Building and Safety Building Bureau Earthquake Safety Division, Guideline 3; pp. 1-8.

Primary Examiner—David A. Scherbel
Assistant Examiner—Kien Nguyen
Attorney, Agent, or Firm—Kelly, Bauersfeld & Lowry

[57] ABSTRACT

A process for attaching a seismic anchor to a wall of an unreinforced masonry structure includes the steps of drilling a generally frusto-conical cavity into the wall, and securing a seismic anchor into the cavity having a frusto-conical plug whose dimensions match at least a portion of the wall cavity. A drill bit utilized to form the wall cavity is adapted to be rotatably driven by a drill motor and includes a generally frusto-conical cutting blade support, a shank extending rearwardly from the blade support to be clamped within the chuck of the drill motor, and a drill stop positioned over the shank and secured to the rear end of the blade support. The blade support includes a plurality of radially extending planar exterior surfaces which span the length of the blade support and provide support surfaces for a plurality of cutting blade inserts. A removable pilot drill bit is fixed to a front end of the blade support for cutting a pilot hole into which the blade support is worked. The seismic anchor includes an attachment support rod having a first end and an adjacent portion thereof threaded for receiving a nut. The plug is preferably formed of a concrete material cast in place over the support rod, having sufficient strength that shear and tension forces applied the support rod will cause a failure of the wall relative to the anchor before any failure of the plug relative to the support rod.

20 Claims, 5 Drawing Sheets

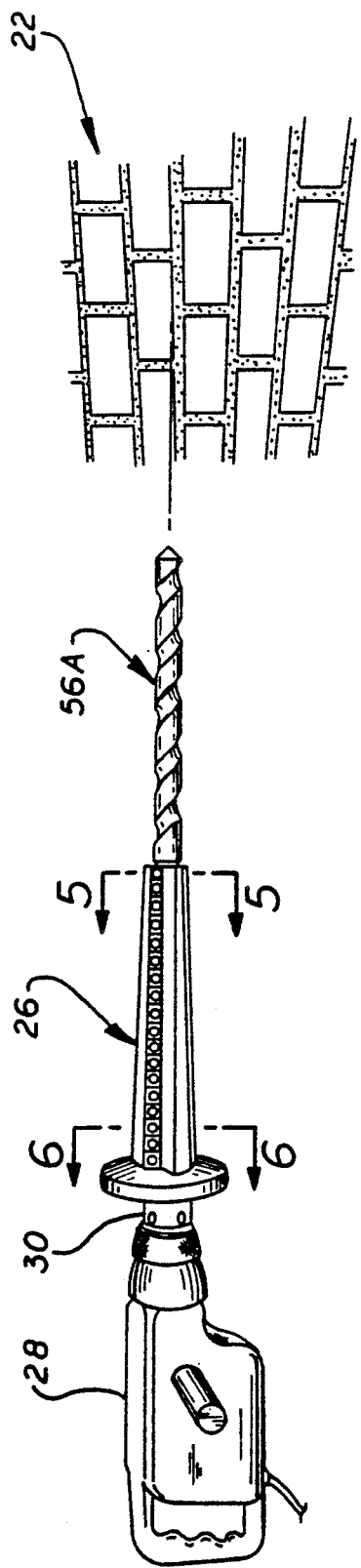
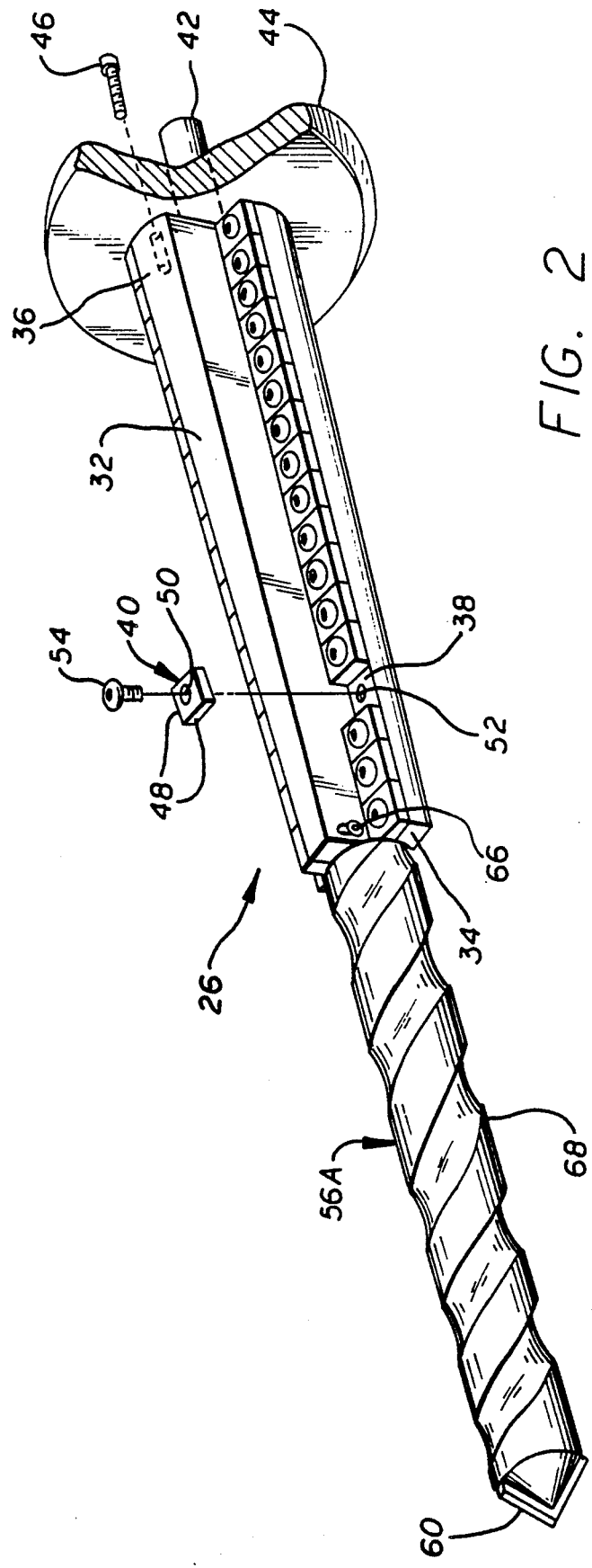
FIG. 1
FIG. 2

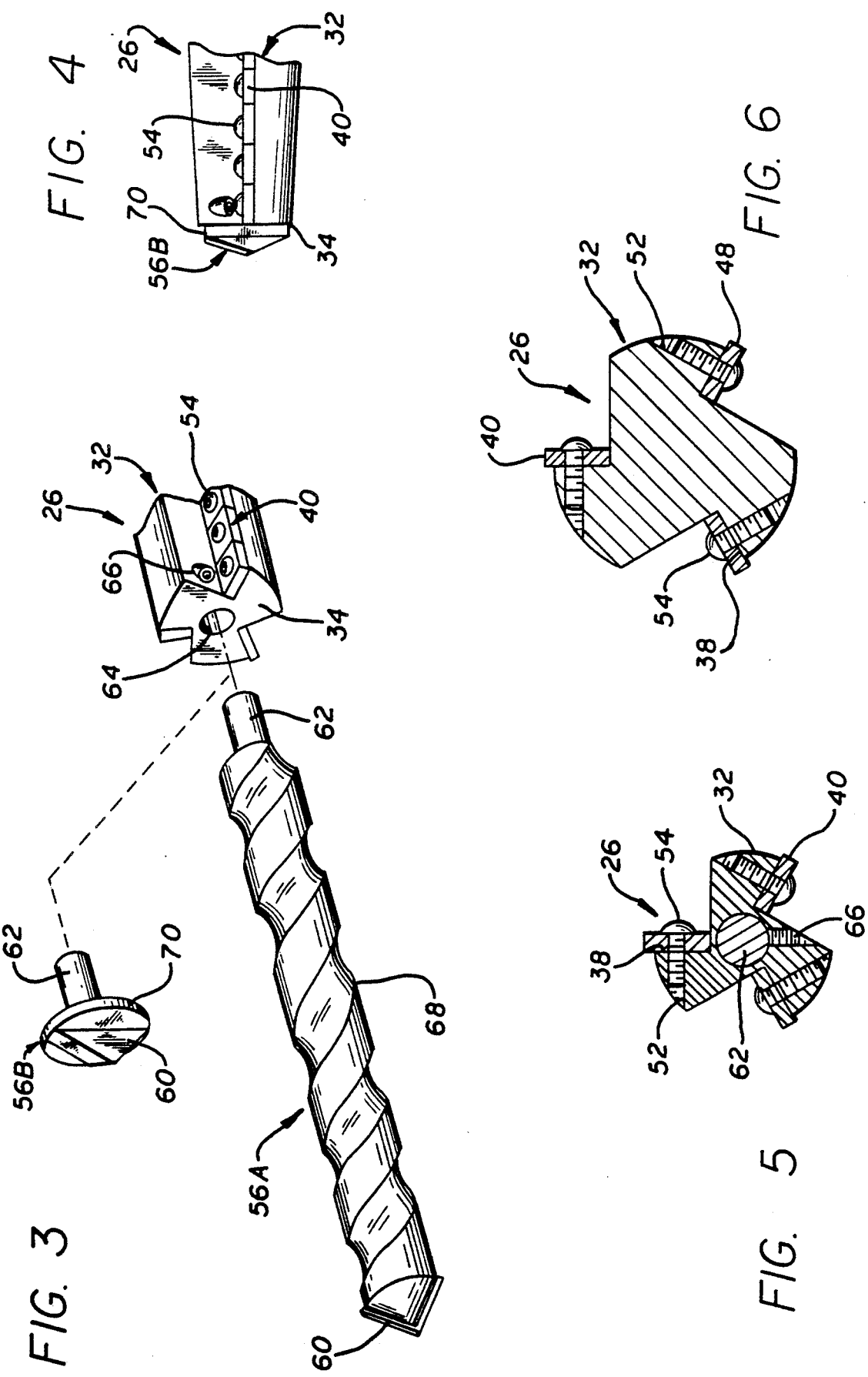

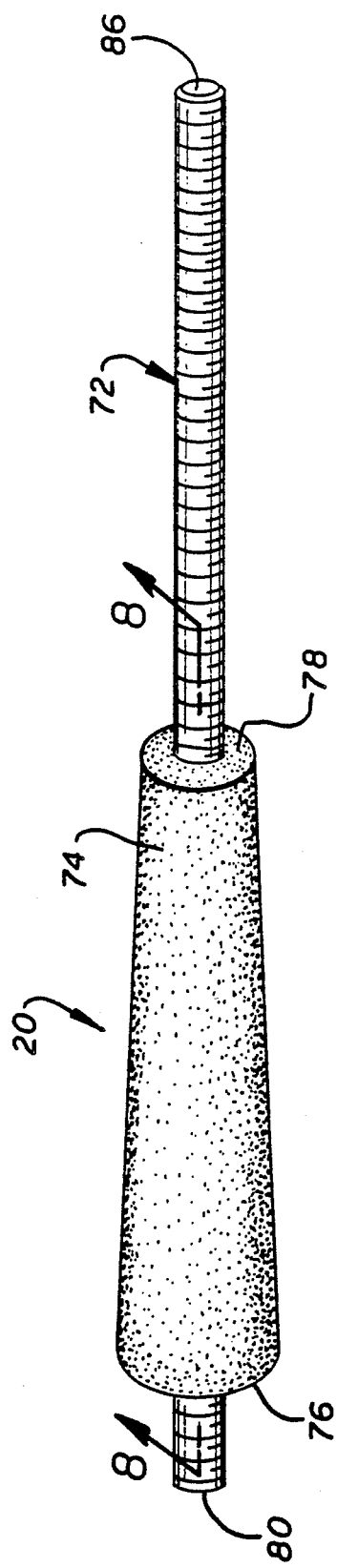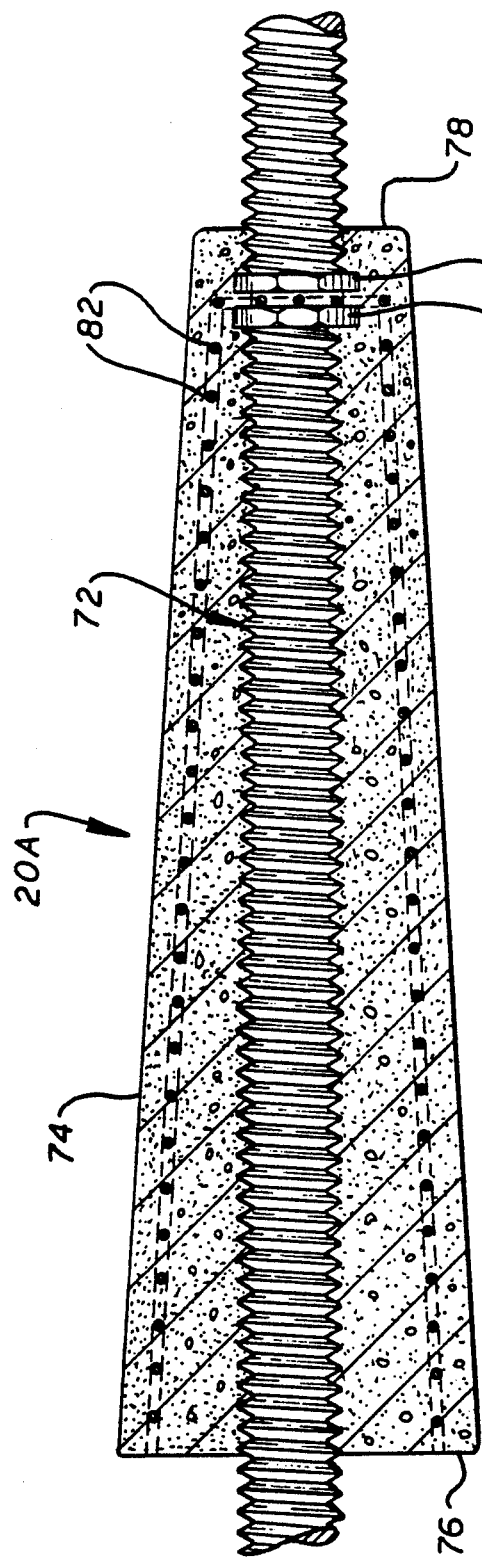

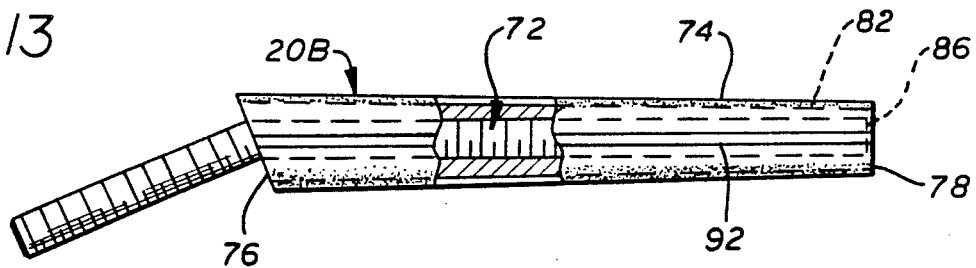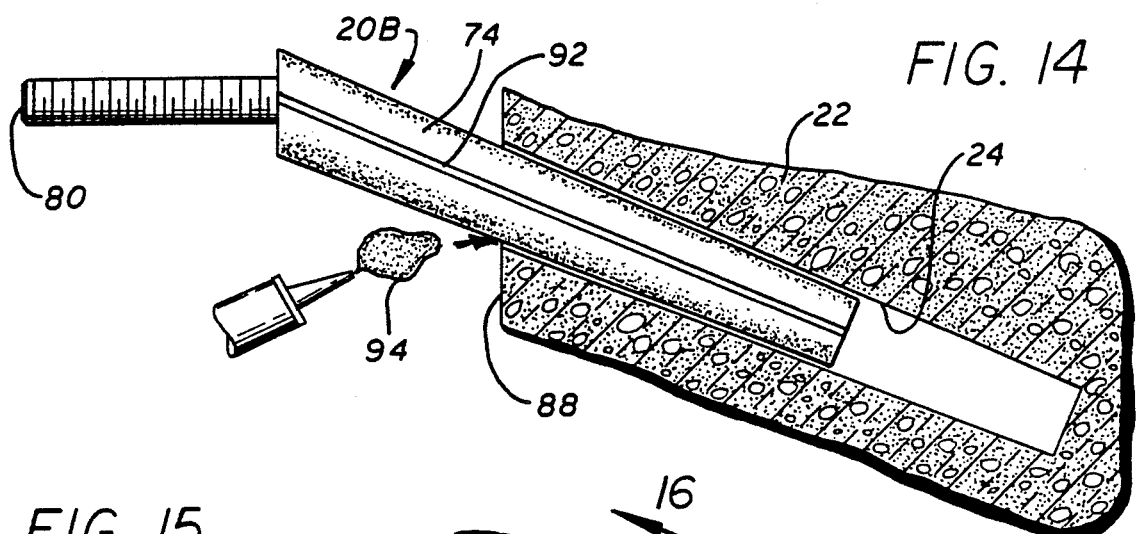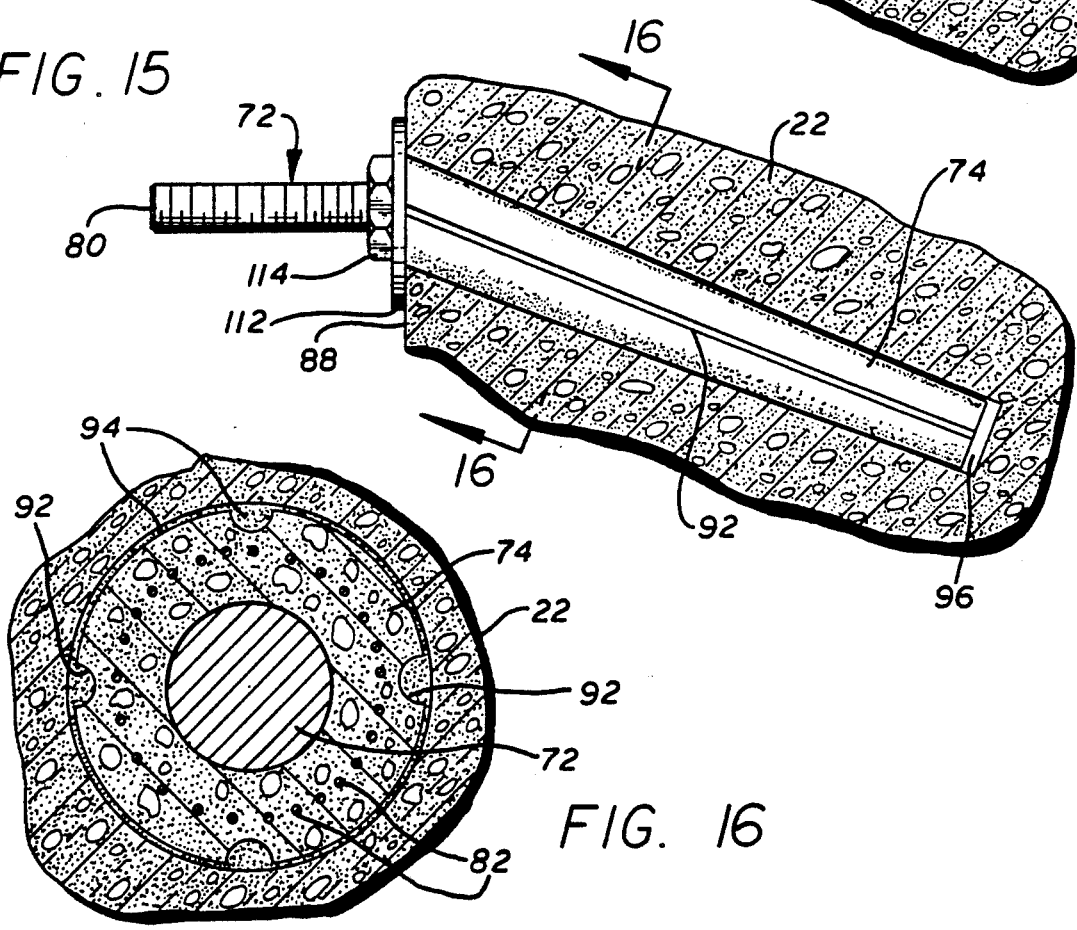

CONICAL SEISMIC ANCHOR AND DRILL BIT FOR USE WITH UNREINFORCED MASONRY STRUCTURES

BACKGROUND OF THE INVENTION

The present invention relates generally to devices and processes for strengthening unreinforced masonry structures against seismic-induced failure. More specifically, the present invention relates to a conical seismic anchor and drill bit, and related processes for anchoring wood and floor roof diaphragms/joists to unreinforced masonry walls to increase seismic safety in older buildings.

One of the first and most effective steps taken to make old unreinforced masonry buildings more seismically resistant is the anchoring of wood floor and roof diaphragms/joists to unreinforced masonry walls. Unanchored walls and diaphragms can separate during a quake, resulting in collapse of one of both and needless deaths and destruction. Anchors keep walls and diaphragms tied together and reduce the chance of failure. Anchoring systems also spread the effects of earthquake forces over more of the structure and from walls perpendicular to seismic acceleration to walls parallel to the acceleration. This allows seismic forces to be dissipated by more of the structure and by parts most able to accept such force (walls parallel to seismic acceleration).

Three anchoring types commonly in use are tension anchors, shear anchors and combination anchors. The type used depends on the specific application, engineering requirements, and the local building codes.

Tension anchors are used to keep walls which are perpendicularly oriented to seismic acceleration from pulling away from floor and roof diaphragms/joists. When not anchored, not only are the walls more likely to pull away from the diaphragms, causing the diaphragms to drop, but the unrestrained unreinforced masonry wall itself can over-extend and collapse. A simple tension anchor is typically a threaded shaft placed within a hole drilled perpendicularly completely through the unreinforced masonry wall, with washers and nuts applied to both ends of the threaded shaft. Brackets and the like are fixed to one end of the threaded shaft and, in turn, connected to floor/roof joists to anchor the unreinforced masonry wall to the joists.

Shear anchors help prevent diaphragms/joists from sliding inside unreinforced masonry walls and also help to transfer seismic forces from the walls to the diaphragms and vice versa. Walls perpendicular to ground acceleration transfer force into anchored diaphragms and then into walls parallel to acceleration through this type of anchor. Shear anchors accept lateral forces, in contrast with the parallel forces accepted by tension anchors.

A shear anchor is not a through bolt. Typically a shear anchor comprises a cylindrical cavity bored at least eight inches into but not completely through the unreinforced masonry wall. Either dry pack mortar or chemical epoxy compounds are used to secure a threaded shaft within the cavity. When dry pack mortar is used, the cavity is usually two and a half inches in diameter. When epoxy compounds are used, the cavity is typically one inch in diameter.

Combination-type anchors combine the functions of both tension and shear anchors into one unit. There are three common types of combination anchors, all of which are mortar or epoxy packed to accept lateral forces like a shear anchor. One type of combination anchor uses a through bolt for tension anchoring. The other two types of combination anchors are angled downwardly from the wall face at $22\frac{1}{2}°$ for tensioning where through bolts are impractical. One such $22\frac{1}{2}°$ anchor utilizes a beveled washer to square the anchor with the wall face, while the other employs a pre-bent anchor bolt.

An excellent publication illustrating prior seismic anchors is The City of Los Angeles Department of Building and Safety, Building Bureau, Earthquake Safety Division Guideline 3 entitled "Torque Testing And Continuous Inspection For Grouted And Chemical, Combination, Shear And Tension Anchors (Rev-890809)" This publication, incorporated herein by reference, illustrates primarily shear and combination seismic anchors, and requirements for testing grouted and chemical anchors as required by §91.8809(f) of the Los Angeles Municipal Code (Earthquake Hazard Ordinance).

A problem encountered with prior seismic anchors is that there exists the possibility that the anchor was improperly installed into the unreinforced masonry wall. Both the chemical anchors and the grouted anchors will fail during a seismic event if the hand-applied chemical filler or non-shrink grout between the threaded bolt and the cylindrical cavity is improperly placed within the cavity. This has necessitated the testing procedure set forth in Guideline 3 mentioned above.

Concrete anchors are not suitable for use in anchoring unreinforced masonry structures against seismic forces. Typical concrete anchors include an element forced into a pre-drilled cavity and caused to expand against the walls of the cavity. Such an anchor, if utilized in unreinforced masonry structures, would simply cause the walls of the pre-drilled cavity to crumble into dust or fail.

Accordingly, there has been a need for a novel seismic anchor and process for attaching the anchor to unreinforced masonry structures, which meets minimum building code strength requirements and yet eliminates, after installation, the need to perform in-place torque, tension and shear testing. Additionally, a novel seismic anchor and installation process is needed which eliminates field mixing requirements, and has a long shelf life without special storage requirements. Moreover, such a seismic anchor and related process is needed which retains structural strength at 350° F., requires no setting time in order to complete installation, and attains maximum strength instantly upon assembly to the unreinforced masonry wall. Further, a novel seismic anchor is needed which can be simply replaced, if necessary, reused, and/or retightened after a small earthquake. The present invention fulfills these needs and provides other related advantages.

SUMMARY OF THE INVENTION

The present invention resides in an improved conical seismic anchor and drill bit for use with unreinforced masonry structures, which are each inexpensive to produce and are utilized to provide shear and tension anchors in a novel, highly efficient and reliable manner. The drill bit comprises a generally frusto-conical cutting member adapted to be rotatably driven by a drill motor or the like, for use in creating a frusto-conical cavity in an unreinforced masonry wall. The seismic anchor comprises an attachment support rod having a first end and a frusto-conical plug placed over, surrounding and fixed to the support rod. The dimensions of the cavity formed by the drill bit and the plug are such that when the seismic anchor is fully inserted into the wall cavity, the frusto-conical exterior surface of the plug is placed in contiguous surface contact with the frusto-conical internal surface of the cavity.

In a preferred form of the invention the drill bit includes a generally frusto-conical cutting blade support having a front end and a rear end, wherein the rear end has a greater diameter than that of the front end. A plurality of radially extending planar exterior surfaces are provided which span the length of the blade support. A shank extends rearwardly from the rear end of the blade support, and drill stop is positioned over the shank and secured to the blade support rear end.

Removable cutting means are attached to the blade support substantially along the length thereof over the planar exterior surfaces. The removable cutting means define a cutting edge capable of cutting a cavity having a frusto-conical inner configuration in the unreinforced masonry wall as the drill bit is rotatably driven. The removable cutting means include a plurality of generally rectangular cutting blade inserts removably fixed to the planar exterior surfaces of the blade support. Each cutting blade insert is configured to provide a plurality of cutting edges, only one of which is actually utilized during the cutting operation at any one time.

Pilot cutting means are attached to the front end of the blade support, for cutting a pilot hole into which the blade support is worked. The pilot cutting means includes a forwardly projecting cutting tip and a rearwardly projecting pilot shank adapted to be inserted within and secured to the front end of the blade support. In one illustrated embodiment, the forwardly projecting cutting tip has a standard drill-like fluted cylinder configuration of sufficient length to provide a pilot hole through the width of the unreinforced masonry structure. In another illustrated embodiment the forwardly projecting cutting tip is shortened to minimize the spacing between the forward tip of the drill bit and the front end of the cutting blade support.

The seismic anchor includes an attachment support rod having a first end and an adjacent portion thereof threaded for receiving a nut, and a frusto-conical plug having a larger end and a smaller end, fixed to the support rod such that the larger end of the plug is situated next to the first end and the adjacent threaded portion of the support rod. The plug itself may include longitudinal exterior flute means which provide ports for inspecting a cement utilized to fix the seismic anchor within the frusto-conical wall cavity. The plug is formed of a concrete material cast in place over the support rod, having sufficient strength that shear and tension forces applied to the support rod will cause a failure of the wall relative to the anchor before any failure of the plug relative to the support rod. Moreover, the plug may include a wire mesh reinforcement surrounding the support rod and embedded in the concrete material.

In a first illustrated embodiment of the seismic anchor, the support rod is threaded its entire length and defines the longitudinal axis of the plug. Both ends of the rod extend away from the plug and may receive a nut. In a second illustrated embodiment of the seismic anchor, the support rod is threaded its entire length and a second end thereof is positioned within the plug and spaced from the small end of the plug such that the second end is completely sealed within the plug, and the support rod defines the longitudinal axis of the plug. The portion of the support rod to which the plug is attached defines the longitudinal axis of the plug, and the support rod first end and the adjacent threaded portion extend angularly away from the plug relative to the plug longitudinal axis.

A process for attaching the seismic anchor to the unreinforced masonry wall includes the steps of drilling the generally frusto-conical cavity into the wall, inserting the seismic anchor into the cavity, and securing the seismic anchor within the wall cavity. More particularly, in a process for attaching a 22½° combination anchor to an unreinforced masonry wall, the drilling step includes drilling a generally frusto-conical cavity into a generally vertical wall at a downward angle relative to the horizontal plane such that only one opening through the wall is created and a narrow end of the cavity is completely enclosed by the wall. The longitudinal axis of the cavity is angularly downwardly directed 22½° from the horizontal plane. The step of securing the seismic anchor within the wall cavity includes application of a cementatious bonding agent to the plug prior to inserting seismic anchor into the cavity. When the seismic anchor is fully inserted into the cavity, the frusto-conical exterior surface of the plug is placed in contiguous surface contact with the frusto-conical internal surface of the cavity, and the narrow end of the cavity is spaced from the adjacent end of the plug.

When a standard combination anchor embodying the present invention is to be fixed to the unreinforced masonry wall, the drilling step includes drilling a generally frusto-conical cavity perpendicular to the wall such that a large end of the cavity is generally adjacent to a first wall face, a narrow end of the cavity is generally enclosed by the wall, and a pilot shaft extends from the narrow end of the cavity to a second wall face. When the seismic anchor is fully inserted into this perpendicular cavity, the frusto-conical exterior surface of the plug is in contiguous surface contact with the frusto-conical internal surface of the cavity, and the narrow end of the cavity is spaced from the adjacent end of the plug. The seismic anchor is secured within the wall cavity by threaded nuts over both ends of the support rod which tighten washer/bracket means against the opposing first and second exterior wall faces.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a standard combination-type drill bit embodying the invention, coupled to an electric drill motor and aligned with an unreinforced masonry wall for creating a generally frusto-conical cavity perpendicular to the wall;

FIG. 2 is an enlarged partially fragmented perspective view of the combination-type drill bit illustrated in FIG. 1, shown with one cutting blade insert removed therefrom;

FIG. 3 is a fragmented exploded perspective view of a front end of the drill bit illustrated in FIGS. 1 and 2, illustrating the manner in which two alternative pilot cutting tips are received within the front end of a generally frusto-conical cutting blade support;

FIG. 4 is a fragmented elevational view of the front end of the drill bit as illustrated in FIG. 3, illustrating an alternative configuration of the drill bit (in contrast to FIGS. 1 and 2) when utilizing a non-fluted, stub-like pilot cutting tip for use in creating cavities, primarily, for 22½° combination anchors;

FIG. 5 is an enlarged vertical section taken generally along the line 5—5 of FIG. 1, illustrating the manner in which cutting blade inserts are attached to the generally frusto-conical cutting blade support over radially extending planar exterior surfaces thereof which extend the length of the cutting blade support;

FIG. 6 is an enlarged vertical section taken generally along the line 6—6 of FIG. 1;

FIG. 7 is a perspective view of a standard combination-type seismic anchor embodying the invention, having a frusto-conical plug fixed to an underlying threaded attachment support rod;

FIG. 8 is an enlarged fragmented vertical section taken generally along the line 8—8 of FIG. 7, illustrating the provision of a wire mesh reinforcement within the plug;

FIG. 13 is an elevational and partially sectional view of a 22½° combination-type seismic anchor embodying the invention;

FIG. 14 is a schematic view of the 22½° seismic anchor of FIG. 13 having a cementatious or epoxy resin binding agent applied to an exterior surface of the plug and being inserted into a frusto-conical cavity prepared utilizing the drill bit of FIG. 4 in an unreinforced masonry wall, where the longitudinal axis of the cavity is angularly downwardly directed 22½° from the horizontal plane;

FIG. 15 is a schematic representation similar to that illustrated in FIG. 14, showing the 22½° seismic anchor fully inserted into the pre-drilled cavity wherein a gap is provided between the interior end of the anchor and the end of the cavity; and FIG. 16 is an enlarged fragmented sectional view taken generally along the line 16—16 of FIG. 15, illustrating the configuration of inspection ports provided by longitudinally extending flutes provided in the exterior surface of the plug, and the uniform application of the cementatious or epoxy resin bonding agent between the plug and the walls of the frusto-conical cavity.

DETAILED DESCRIPTION OF THE PREFERRED EMBODIMENTS

Figure 9:
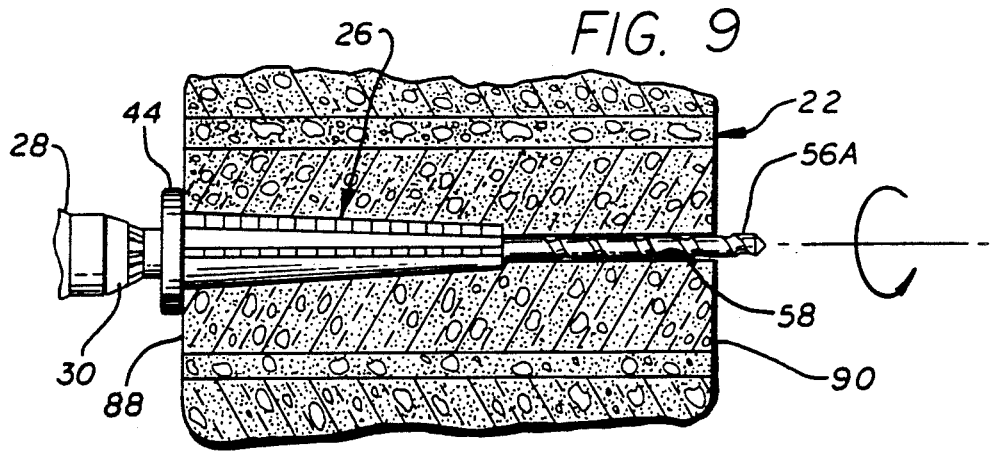
FIG. 9 is a schematic view illustrating the manner in which the drill bit of FIGS. 1 and 2 is utilized to form a generally frusto-conical cavity through a brick wall of an unreinforced masonry structure, wherein a pilot shaft is provided to accommodate the support rod of the standard combination-type seismic anchor shown in FIGS. 7 and 8.

As shown in the drawings for purposes of illustration, the present invention is concerned with an improved conical seismic anchor, generally designated in FIG. 7 by the reference number 20. The process of installing the conical seismic anchor 20 into an unreinforced masonry wall 22 requires the boring out of a generally frusto-conical cavity 24 in the wall by means of a novel drill bit, generally designated in FIG. 2 by the reference number 26.

In accordance with the present invention, and as illustrated in FIGS. 1 through 6, the drill bit 26 is adapted to be rotatably driven by a drill motor 28 or the like, which typically includes a chuck 30 which may be tightened about a drill shank in a conventional manner (FIG. 1). With specific reference to FIGS. 2, 3, 5 and 6 one preferred configuration of the drill bit 26 utilized to prepare cavities extending perpendicularly through unreinforced masonry walls 22, includes a generally frusto-conical cutting blade support 32 having a front end 34 and a rear end 36. In the exemplary embodiment, the diameter of the front end 34 is approximately one and one half inches, whereas the diameter of the rear end 36 is approximately two inches. The blade support 32 includes three radially extending planar exterior surfaces 38 which span the length of the blade support. These planar exterior surfaces 38 are preferably circumferentially equidistantly spaced from one another, and provide support surfaces for rectangular cutting blade inserts 40.

A one half inch diameter shank 42 extends rearwardly from the rear end 36 of the cutting blade support 32 along its longitudinal axis. This shank 42 may be inserted into the chuck 30 of the drill motor 28 for purposes of coupling the drill bit 26 to the drill motor 28. A drill stop 44 is positioned over the shank 42 and positioned to abut the rear end 36 of the cutting blade support. The drill stop has a diameter substantially greater than the diameter of the rear end 36, and is fixed to the cutting blade support 32 by means of a set screw 46. The purpose of the drill stop 44 is to limit travel of the drill bit 26 through the unreinforced masonry wall 22.

The cutting blade inserts 40 provide the drill bit 26 with removable cutting means attached to the blade support 32. The inserts 40 define, collectively, a cutting edge capable of cutting a cavity having a frusto-conical inner configuration in the unreinforced masonry wall 22 as the drill bit 26 is rotatably driven. Each cutting blade insert 40 is constructed to include eight cutting edges 48, and is provided with a central aperture 50 therethrough. The cutting blade insert aperture 50 is aligned with threaded apertures 52 provided through the blade support 32 to permit the cutting blade inserts 40 to be secured by means of a button head cap screw 54 over the planar exterior surfaces 38. As illustrated best in FIGS. 5 and 6, the cutting blade inserts 40 are dimensioned to extend beyond the outer circumference of the cutting blade support 32, in order to expose a cutting edge 48.

It will be noted that through the provision of cutting blade inserts 40 having eight cutting edges 48 as illustrated, should a particular cutting edge become dulled through use, the screw 54 may be removed and the orientation of the cutting blade insert 40 relative to the cutting blade support 32 modified to expose a new cutting edge 48. This effectively prolongs the useful life of the drill bit 26. The cutting blade inserts are preferably constructed of a carbide material to enhance their cutting characteristics.

Affixed to the front end 34 of the cutting blade support 32 is a pilot drill tip 56. Two alternative pilot drill tips 56A and 56B are illustrated in FIGS. 2 through 4. One such pilot drill tip 56A is utilized to provide a pilot hole 58 through the width of the unreinforced masonry wall 22 when the standard combination-type seismic anchor 20A illustrated in FIGS. 7 through 12 is to be used. The other pilot drill tip 56B is utilized when a pilot hole is not to be drilled through the unreinforced masonry wall, for example when the 22½° combination-type seismic anchor illustrated in FIGS. 13 through 16 is utilized, or when a shear-type seismic anchor is to be installed.

Both of the pilot drill tips 56A ad 56B create a pilot cavity into which the cutting blade support 32 is worked. Each further includes a forwardly projecting carbide cutting tip 60 and a rearwardly projecting pilot shank 62. The pilot shank 62 is adapted to be inserted within a cavity 64 provided on the front end 34 of the cutting blade support along the longitudinal axis thereof, and be secured therein by means of a set screw 66. The pilot drill tip 56A has a standard drill-like fluted cylindrical body 68 extending between the cutting tip 60 and the pilot shank 62, of sufficient length to provide the pilot hole 58 through the width of the unreinforced masonry wall 22. The pilot drill tip 56B illustrated in FIGS. 3 and 4, on the other hand, simply includes a narrow base 70 connecting the cutting tip 60 to the pilot shank 62.

With reference now to FIGS. 7, 8 and 13, two alternate embodiments of the conical seismic anchor 20 are shown. The seismic anchor 20A illustrated in FIGS. 7 through 12 is typically placed within a frusto-conical cavity 34 created by the drill bit 26 utilizing the pilot drill tip 56A. This is a standard combination-type seismic anchor. The second illustrated seismic anchor 20B shown in FIGS. 13 through 16 is a 22½° combination-type anchor typically placed within a frusto-conical cavity 24 in the unreinforced masonry wall 22 created by the drill bit 26 utilizing the pilot drill tip 56B. This particular type of seismic anchor 20B is preferred when it is deemed undesirable or impracticable to have a portion of the anchor extending through both sides of the wall 22. It is to be appreciated from the following, moreover, that the discussion relating to the seismic anchors 20A and 20B can be applied to a similarly constructed shear anchor as well.

Each seismic anchor 20A and 20B includes a threaded attachment support rod 72 and a frusto-conical plug 74 having a larger end 76 and a smaller end 78. The plug 74 is placed over, surrounds and is fixed to the support rod 72 such that the larger end 76 is situated next to a first end 80 of the support rod 72. The plug is preferably formed of a concrete material cast in place over the support rod 72, having sufficient strength that shear and tension forces applied to the support rod will cause a failure of the wall 22 relative to the anchor 20 before any failure of the plug 74 relative to the support rod 72. The plug 74 may be formed of any other suitable material which meets this criteria.

As illustrated in FIG. 8, the support rod 72 is threaded its entire length and extends through and defines the longitudinal axis of the plug 74. The plug 74 also includes a wire mesh reinforcement 82 surrounding the support rod 72 and embedded in the concrete material. The wire mesh reinforcement 82 is secured to the support rod 72 by means of two thin wall hex nuts 84, which were threaded onto the support rod 72 prior to casting the plug 74 in place.

The seismic anchor 20A includes a support rod 72 which extends completely through the plug 74. A second end 86 of the support rod 72 extends away from the plug 74 opposite the first end 80 a sufficient distance to allow both the first and second ends of the support rod 72 to project outwardly from respective faces 88 and 90 of the unreinforced masonry wall 22.

In contrast, the second end 86 of the support rod 72 of the 22½° seismic anchor 20B (FIG. 13) is positioned within the plug 74 and spaced from the smaller end 78 thereof. In this particular embodiment of the seismic anchor, the second end 86 of the support rod 72 is completely sealed within the plug 74. The portion of the support rod 72 adjacent to the first end 80 extends angularly away from the plug 74 relative to the plug's longitudinal axis. Further, the 22½° seismic anchor 20B of FIGS. 13 through 16 is illustrated as including exterior, longitudinally extending flutes 92. These flutes provide ports for inspecting a cementatious or epoxy resin bonding agent 94 utilized to fix the seismic anchor 20B within the frusto-conical cavity 24 in the unreinforced masonry wall 22 (see FIG. 16).

Two related processes for installing the seismic anchors 20A and 20B of the present invention utilizing the drill bit 26 are illustrated in FIGS. 9 through 12 and 14 through 16. Both illustrated processes for attaching the seismic anchors 20A and 20B to the unreinforced masonry wall 22 include the steps of drilling a generally frusto-conical cavity 24 into the wall 22 utilizing the drill bit 26, inserting an appropriate seismic anchor 20A or 20B into the cavity 24, and then securing the seismic anchor within the wall cavity.

For the process illustrated in FIGS. 9 through 12, a generally frusto-conical cavity 24 is drilled into the unreinforced masonry wall 22 generally perpendicular to the wall faces 88 and 90. The drill bit 26 having the lengthened pilot drill tip 56A is utilized during this procedure. The larger end of the cavity 24 is preferably generally adjacent to the first wall face 88, and a narrow end of the cavity 24 is generally enclosed by the wall 22. A pilot hole or shaft 58 extends from the narrow end of the cavity to the second wall face 90 (FIG. 9).

Figure 10:
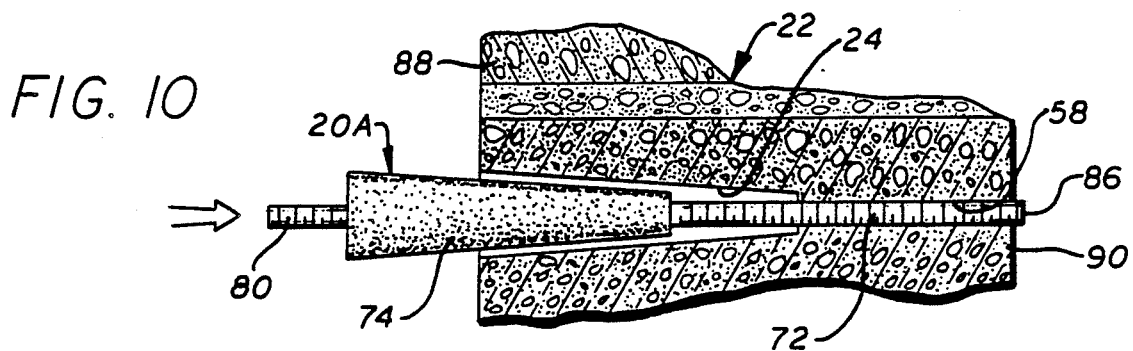
FIG. 10 is a schematic view similar to FIG. 9, illustrating insertion of the standard combination-type seismic anchor into the generally frusto-conical cavity created during the drilling step illustrated in FIG. 9.

The standard combination seismic anchor 20A is then inserted into the cavity 24 through the first wall face 88 (FIG. 10). When the seismic anchor 20A is fully inserted into the cavity 24, the frusto-conical exterior surface of the plug 74 is in contiguous surface contact with the frusto-conical internal surface of the cavity 24. Further, the narrow end of the cavity is spaced from the smaller end 78 of the plug. This gap 96 advantageously permits the seismic anchor 20A to be tightened into the cavity 24 during original installation or after a small earthquake, without bottoming out.

Figure 11:
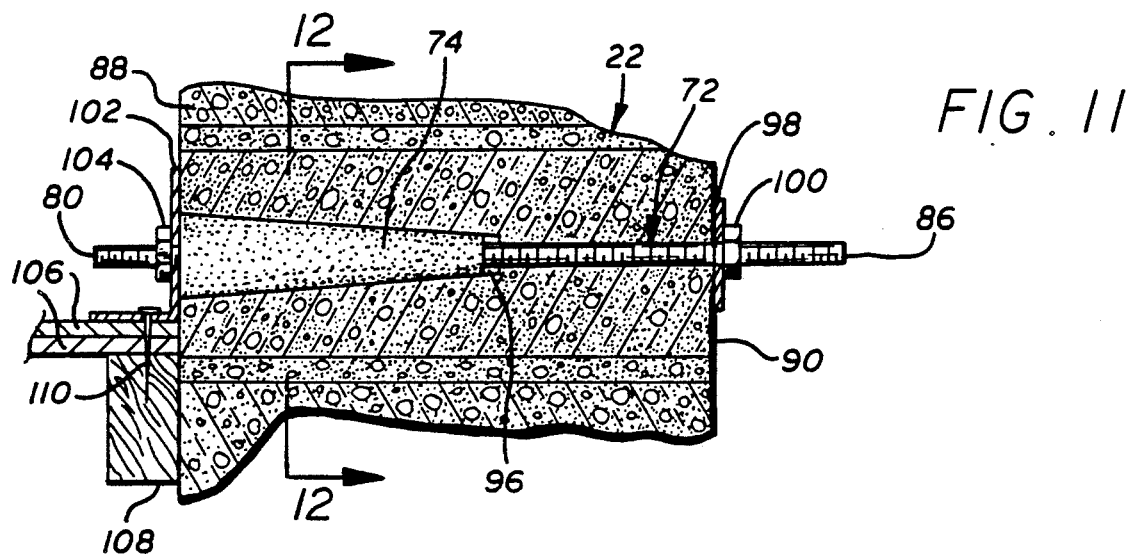
FIG. 11 is a schematic illustration similar to those shown in FIGS. 9 and 10, illustrating the final positioning of the standard combination seismic anchor within the cavity provided such that a gap exists between the inward planar end of the plug and an inner end of the frusto-conical cavity, and further illustrating attachment of the standard combination anchor to the unreinforced masonry wall and an associated floor/roof structure.
Figure 12:
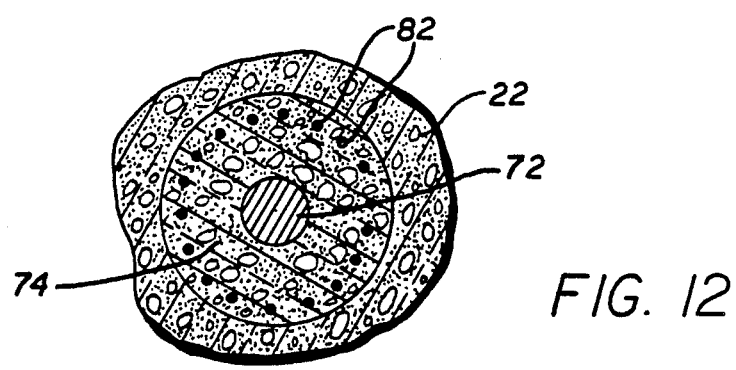
FIG. 12 is an enlarged fragmented vertical section taken generally alone the line 12—12 of FIG. 11, illustrating intimate mating contact between the frusto-conical exterior surface of the plug with the frusto-conical internal surface of the cavity.

After the seismic anchor 20A is fully inserted into the cavity 24, the anchor is secured therein by placing a large washer 98 over the second end 86 of the support rod 72, and securing it in place by means of a nut 100. The washer 98 should lie flush against the second wall face 90. In a like manner, a bracket 102 is placed over the first end 80 of the support rod 72 to lie flush against the first wall face 88 and is held thereon by means of a nut 104. The bracket 102 provides means for connecting the seismic anchor 20A to a wood floor or roof section 106 and/or a rim joist 108 by means of a nail, screw or the like 110 (FIG. 11). The contiguous surface contact between the plug 74 and the cavity 24 is illustrated in FIG. 12.

In the second alternative illustrated process for installing the 22½° seismic anchor 20B within the unreinforced masonry wall 22, shown in FIGS. 14 through 16, the drill bit 26 having the shortened pilot drill tip 56B is utilized to create the frusto-conical cavity 24. In this procedure the drilling step includes drilling a generally frusto-conical cavity into the wall 22 at a downward angle relative to the horizontal plane such that only one opening through the wall is created and a narrow end of the cavity is completely enclosed by the wall. Preferably the longitudinal axis of the cavity 24 is angularly downwardly directed 22½° from the horizontal plane. After the cavity 24 has been created, the 22½° seismic anchor 20B is inserted through the opening in the first wall face 88 such that the first end 80 of the attachment support rod extends perpendicularly away from the first wall face 88 (FIG. 14). Prior to inserting the seismic anchor 20B into the cavity 24, a cementatious bonding agent 94 can be applied to the plug 74. It is believed, however, that this step is optional.

After the seismic anchor 20B is fully inserted into the downwardly directed, closed-end, frusto-conical cavity 24, the larger end 76 of the plug 74 should lie flush with the first wall face 88, and the smaller end 78 should be spaced from the narrow end of the cavity 24 by the gap 96. Moreover, the frusto-conical exterior surface of the plug 74 should be in contiguous surface contact with the frusto-conical internal surface of the cavity 24, or spaced only slightly therefrom to accommodate a uniformly thin layer of the bonding agent 94 between those two facing surfaces (FIGS. 15 and 16). The flutes 92 permit a building inspector to readily ascertain whether the bonding agent 94 had been applied to the plug 74 prior to installation.

A large washer 112 is then placed over the first end 80 of the support rod 72 and secured in place flush against the first wall face 88 by means of a nut 114. The washer 112 should be sufficiently large to contact substantial portions of the first wall face 88. The washer 112, moreover, may be replaced by the bracket 102 as illustrated in FIG. 11.

From the foregoing it is to be appreciated that the improved conical seismic anchor 20, and the related installation process utilizing the drill bit 26, provide a novel alternative to existing seismic anchors by minimizing installation-induced causes of anchor failure. The conical seismic anchor 20 of the present invention can be efficiently constructed to meet virtually any minimum building code requirement, and yet the installation procedure has been simplified to the degree that the need for torque, tension and in-place shear testing has been eliminated. Many of the drawbacks associated with the field mixing and application of packing materials in the prior art have been eliminated. The seismic anchor of the present invention requires no special storage conditions, has no long term deterioration restrictions, nor is there a limited shelf life. Additionally, the novel seismic anchor 20 of the present invention does not emit an objectional odor as some of the chemical anchors do, does not produce toxic fumes when burned, retains its structural strength at 350° F., and requires no setting time as it reaches one hundred percent of its strength instantly upon assembly to the unreinforced masonry wall 22. The anchor may be tightened after small earthquakes, is extremely easy to install, may be replaced as needed and reused, and exhibits thermodynamic compatibility with the masonry structure in which it is installed.

Although several particular embodiments of the invention have been described in detail for purposes of illustration, various modifications of each may be made without departing from the spirit and scope of the invention. Accordingly, the invention is not to be limited, except as by the appended claims.

I claim:

1. A process for attaching a seismic anchor to a wall of an unreinforced masonry structure, the steps comprising:

drilling a generally frusto-conical cavity into the wall;

inserting a seismic anchor into the cavity, the seismic anchor including an attachment support rod having a first end and an adjacent portion thereof threaded for receiving a nut, and a frusto-conical plug having a larger end and a smaller end, placed over, surrounding and fixed to the support rod such that the larger end of the plug is situated next to the threaded end and adjacent portion of the support rod, such that the exterior frusto-conical surface of the plug fully engages the interior frusto-conical surfaces of the wall cavity; and securing the seismic anchor within the wall cavity.

2. A process as set forth in claim 1, wherein the drilling step includes drilling a generally frusto-conical cavity into a generally vertical wall at a downward angle relative to the horizontal plane such that only one opening through the wall is created and a narrow end of the cavity is completely enclosed by the wall.

3. A process as set forth in claim 2, wherein the longitudinal axis of the cavity is angularly downwardly directed 22½° from the horizontal plane.

4. A process as set forth in claim 3, wherein when the seismic anchor is fully inserted into the cavity, the frusto-conical exterior surface of the plug is in contiguous surface contact with the frusto-conical internal surface of the cavity, and the narrow end of the cavity is spaced from the adjacent end of the plug.

5. A process as set forth in claim 2, wherein the step of securing the seismic anchor within the wall cavity includes the step of applying a cementatious bonding agent to the plug prior to inserting the seismic anchor into the cavity.

6. A process as set forth in claim 5, wherein the plug includes longitudinal exterior flute means for providing ports for inspecting the cementatious bonding agent.

7. A process as set forth in claim 2, including the step of providing a seismic anchor wherein the support rod is threaded its entire length and a second end thereof is positioned within the plug and spaced from the smaller end of the plug such that the second end is completely sealed within the plug, the support rod defining the longitudinal axis of the plug, and wherein the support rod first end and adjacent threaded portion extend angularly away from the plug relative to the plug's longitudinal axis.

8. A process as set forth in claim 1, wherein the drilling step includes drilling a generally frusto-conical cavity perpendicular to the wall such that a large end of the cavity is generally adjacent to a first wall face, a narrow end of the cavity is generally enclosed by the wall, and a pilot shaft extends from the narrow end of the cavity to a second wall face.

9. A process as set forth in claim 8, wherein when the seismic anchor is fully inserted into the cavity, the frusto-conical exterior surface of the plug is in contiguous surface contact with the frusto-conical internal surface of the cavity, and the narrow end of the cavity is spaced from the adjacent end of the plug.

10. A process as set forth in claim 9, including the step of providing a seismic anchor in which the support rod is threaded its entire length and extends through and defines the longitudinal axis of the plug such that both ends of the rod may receive a nut, wherein after the step of inserting a seismic anchor into cavity, the first end of the support rod extends outwardly from the first wall face and the second end of the support rod extends through the pilot shaft and outwardly away from the second wall face.

11. A process as set forth in claim 9, wherein the step of securing the seismic anchor within the wall cavity includes the step of threading nuts over both ends of the support rod to tighten washer/bracket means against the opposing first and second exterior wall faces.

12. A process for attaching a seismic anchor to a wall of an unreinforced masonry structure, the steps comprising:
drilling a generally frusto-conical cavity into the wall at a downward angle relative to the horizontal plane such that only one opening through the wall is created and a narrow end of the cavity is completely enclosed by the wall; and
inserting a seismic anchor into the cavity, the seismic anchor including an attachment support rod having a first end and an adjacent portion thereof threaded for receiving a nut, and a frusto-conical plug having a larger end and a small end, placed over, surrounding and fixed to the support rod such that the larger end of the plug is situated next to the threaded end and adjacent portion of the support rod, such that the exterior frusto-conical surface of the plug fully engages the interior frusto-conical surfaces of the wall cavity.

13. A process as set forth in claim 12, wherein the longitudinal axis of the cavity is angularly downwardly directed 22½° from the horizontal plane.

14. A process as set forth in claim 12, including the step of securing the seismic anchor within the wall cavity by applying a cementitious bonding agent to the plug prior to inserting the seismic anchor into the cavity, the plug including longitudinal exterior flute means for providing ports for inspecting the cementitious bonding agent.

15. A process as set forth in claim 12, including the step of providing a seismic anchor wherein the support rod is threaded its entire length and a second end thereof is positioned within the plug and spaced from the smaller end of the plug such that the second end is completely sealed within the plug, the support rod defining the longitudinal axis of the plug, and wherein the support rod first end and adjacent threaded portion extend angularly away from the plug relative to the plug's longitudinal axis.

16. A process as set forth in claim 15, wherein the plug is formed of a concrete material cast in place over the support rod, having sufficient strength that shear and tension forces applied to the support rod will cause a failure of the wall relative to the anchor before any failure of the plug relative to the support rod, and wherein the plug includes a wire reinforcement surrounding the support rod and embedded in the concrete material.

17. A process as set forth in claim 12, wherein the support rod is threaded its entire length and extends through and defines the longitudinal axis of the plug such that both ends of the rod may receive a nut.

18. A process for attaching a seismic anchor to a wall of an unreinforced masonry structure, the steps comprising:
drilling a generally frusto-conical cavity perpendicularly into the wall such that a large end of the cavity is generally adjacent to a first wall face, a narrow end of the cavity is generally enclosed by the wall, and a pilot shaft extends from the narrow end of the cavity to a second wall face;
inserting a seismic anchor into the cavity, the seismic anchor including an attachment support rod having a first end and a second end thereof threaded for receiving a nut, and a frusto-conical plug having a larger end and a smaller end, placed over, surrounding and fixed to the support rod such that the larger end of the plug is situated next to the first end of the support rod, such that when the seismic anchor is fully inserted into the cavity, the frusto-conical exterior surface of the plug is in contiguous surface contact with the frusto-conical internal surface of the cavity, wherein the first end of the support rod extends outwardly from the first wall face and the second end of the support rod extends through the pilot shaft and outwardly away from the second wall face; and
securing the seismic anchor within the wall cavity, including the step of threading nuts over both ends of the support rod to tighten washer/bracket means against the opposing first and second exterior wall faces.

19. A process as set forth in claim 18, wherein the plug is formed of a concrete material cast in place over the support rod, having sufficient strength that shear and tension forces applied to the support rod will cause a failure of the wall relative to the anchor before any failure of the plug relative to the support rod, and wherein the plug includes a wire reinforcement surrounding the support rod and embedded in the concrete material.

20. A process as set forth in claim 18, including the step of securing the seismic anchor within the wall cavity by applying a cementitious bonding agent to the plug prior to inserting the seismic anchor into the cavity, the plug including longitudinal exterior flute means for providing ports for inspecting the cementitious bonding agent.

* * * * *